United States Patent
Schmitz

(10) Patent No.: US 11,336,474 B2
(45) Date of Patent: May 17, 2022

(54) COLLABORATION SYSTEM FOR A VIRTUAL SESSION WITH MULTIPLE TYPES OF MEDIA STREAMS

(71) Applicant: RINGCENTRAL, INC., Belmont, CA (US)

(72) Inventor: Ulrich Schmitz, Wurselen (DE)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 15/883,142

(22) Filed: Jan. 30, 2018

(65) Prior Publication Data

US 2018/0167227 A1    Jun. 14, 2018

Related U.S. Application Data

(63) Continuation of application No. 14/399,083, filed as application No. PCT/EP2013/000524 on Feb. 22, 2013, now abandoned.

(51) Int. Cl.

| | |
|---|---|
| *H04L 12/18* | (2006.01) |
| *H04L 29/06* | (2006.01) |
| *H04L 65/60* | (2022.01) |
| *H04L 65/403* | (2022.01) |
| *G06F 3/0484* | (2022.01) |

(Continued)

(52) U.S. Cl.
CPC ........ *H04L 12/1822* (2013.01); *G06F 3/0484* (2013.01); *H04L 65/403* (2013.01); *H04L 65/605* (2013.01); *H04L 67/08* (2013.01); *H04L 67/303* (2013.01); *H04L 67/36* (2013.01); *H04W 4/60* (2018.02)

(58) Field of Classification Search
CPC ........... H04N 7/147; H04N 21/234363; H04N 21/23655; H04N 21/6379; G06F 17/30056; G06F 3/0484; H04L 12/1822; H04L 65/605; H04L 65/403; H04L 67/08; H04L 67/36; H04L 67/303; H04W 4/60
See application file for complete search history.

(56) References Cited

U.S. PATENT DOCUMENTS 5,473,363 A    12/1995  Ng et al.
5,774,674 A     6/1998  Gutmann et al.
(Continued)

OTHER PUBLICATIONS

Session Description Protocol (SDP) Offer/Answer Examples, Dec. 2005, 24 pages (Year: 2005).*

(Continued)

*Primary Examiner* — Yongjia Pan
(74) *Attorney, Agent, or Firm* — Finnegan, Henderson, Farabow, Garrett & Dunner, LLP

(57) ABSTRACT

A method for controlling data streams of a virtual session with several participants who access at least access one application in the virtual session can include use of a selected media processing and a signaling mode in a centralized process for each participant according to the individual requirements of the participant. The process can be controlled by a server. The selection of the media processing and/or signaling mode can be made on the basis of an evaluation of the terminal of the respective participant and the network bandwidth available to the respective participant. An evaluation scheme with a plurality of evaluation criteria can be provided for the evaluation, and possible media processing and/or signaling modes are ascertained for the respective participant.

20 Claims, 7 Drawing Sheets

(51) Int. Cl.
*H04L 67/08* (2022.01)
*H04L 67/75* (2022.01)
*H04L 67/303* (2022.01)
*H04W 4/60* (2018.01)

(56) References Cited

U.S. PATENT DOCUMENTS

| | | | |
|---|---|---|---|
| 5,859,979 A * | 1/1999 | Tung | G06Q 10/10 |
| | | | 348/E7.082 |
| 6,175,856 B1 * | 1/2001 | Riddle | H04N 7/148 |
| | | | 348/E7.082 |
| 6,373,839 B1 * | 4/2002 | Clark | H04L 29/06 |
| | | | 370/263 |
| 6,421,706 B1 | 7/2002 | McNeill et al. | |
| 6,453,336 B1 * | 9/2002 | Beyda | H04L 29/06 |
| | | | 709/204 |
| 6,789,123 B2 * | 9/2004 | Li | H04L 29/06027 |
| | | | 370/232 |
| 6,909,708 B1 | 6/2005 | Krishnaswamy et al. | |
| 7,058,721 B1 * | 6/2006 | Ellison | G11B 27/031 |
| | | | 348/E5.008 |
| 7,089,285 B1 | 8/2006 | Drell | |
| 7,197,557 B1 * | 3/2007 | Asar | H04L 41/5009 |
| | | | 707/999.103 |
| 7,400,889 B2 | 7/2008 | Balasubramanian et al. | |
| 7,496,188 B2 | 2/2009 | Saha et al. | |
| 7,532,628 B2 * | 5/2009 | Lepore | H04L 29/06027 |
| | | | 370/401 |
| 7,580,375 B1 * | 8/2009 | Friedrich | H04L 12/1822 |
| | | | 348/14.01 |
| 7,653,013 B1 * | 1/2010 | Moran | H04L 12/1822 |
| | | | 370/261 |
| 7,706,319 B2 * | 4/2010 | Jabri | H04L 29/06027 |
| | | | 370/272 |
| 7,796,603 B1 * | 9/2010 | Bertone | H04L 65/1069 |
| | | | 370/395.2 |
| 7,830,824 B2 * | 11/2010 | Decker | H04L 67/306 |
| | | | 370/262 |
| 7,881,235 B1 * | 2/2011 | Arthur | H04L 12/1818 |
| | | | 370/261 |
| 7,953,867 B1 * | 5/2011 | Andreasen | H04L 65/1006 |
| | | | 709/203 |
| 8,134,587 B2 | 3/2012 | Niu et al. | |
| 8,145,770 B2 | 3/2012 | Hagendorf | |
| 8,250,141 B2 | 8/2012 | Xiao et al. | |
| 8,300,789 B2 | 10/2012 | Shah et al. | |
| 8,595,296 B2 * | 11/2013 | Berberian | H04L 65/4038 |
| | | | 709/204 |
| 8,692,862 B2 | 4/2014 | N'guessan | |
| 8,718,145 B1 * | 5/2014 | Wang | H04N 19/40 |
| | | | 375/240.21 |
| 8,732,244 B2 * | 5/2014 | Karniely | H04L 65/4038 |
| | | | 709/204 |
| 8,842,159 B2 * | 9/2014 | Lu | H04L 65/602 |
| | | | 348/14.12 |
| 8,972,223 B2 | 3/2015 | Yatko et al. | |
| 8,976,223 B1 | 3/2015 | Leske | |
| 9,007,426 B2 | 4/2015 | Kramarenko et al. | |
| 9,210,302 B1 | 12/2015 | Holmer et al. | |
| 9,374,232 B2 * | 6/2016 | Midtskogen Berger | H04L 12/1822 |
| 2002/0143975 A1 * | 10/2002 | Kimura | H04N 21/234336 |
| | | | 709/231 |
| 2004/0024900 A1 * | 2/2004 | Breiter | H04L 29/06027 |
| | | | 709/231 |
| 2004/0076145 A1 * | 4/2004 | Kauhanen | H04L 65/1043 |
| | | | 370/352 |
| 2005/0034079 A1 * | 2/2005 | Gunasekar | G06Q 10/10 |
| | | | 715/753 |
| 2005/0044503 A1 * | 2/2005 | Richardson | H04L 65/403 |
| | | | 715/753 |
| 2005/0078170 A1 * | 4/2005 | Firestone | H04L 12/1822 |
| | | | 348/14.08 |
| 2006/0023062 A1 * | 2/2006 | Elbaze | H04N 7/15 |
| | | | 348/14.09 |
| 2007/0093238 A1 * | 4/2007 | Lin | H04N 7/15 |
| | | | 455/416 |
| 2007/0230372 A1 * | 10/2007 | He | H04L 12/66 |
| | | | 370/260 |
| 2007/0233901 A1 | 10/2007 | Kuan et al. | |
| 2008/0031225 A1 | 2/2008 | Chavda et al. | |
| 2008/0043720 A1 * | 2/2008 | Kucmerowski | H04M 3/42229 |
| | | | 370/352 |
| 2008/0063173 A1 | 3/2008 | Sarkar et al. | |
| 2008/0117965 A1 * | 5/2008 | Vysotsky | H04L 65/1083 |
| | | | 375/240.01 |
| 2008/0144501 A1 * | 6/2008 | Nagy | H04W 28/22 |
| | | | 370/235 |
| 2008/0227438 A1 * | 9/2008 | Fletcher | H04M 3/567 |
| | | | 455/416 |
| 2008/0267282 A1 * | 10/2008 | Kalipatnapu | H04L 12/1822 |
| | | | 348/14.08 |
| 2009/0204906 A1 * | 8/2009 | Irving | H04N 7/15 |
| | | | 715/753 |
| 2009/0315975 A1 * | 12/2009 | Wiener | H04N 7/152 |
| | | | 348/14.09 |
| 2009/0327499 A1 * | 12/2009 | Strickland | H04L 69/24 |
| | | | 709/228 |
| 2010/0208634 A1 * | 8/2010 | Eng | H04L 43/087 |
| | | | 370/310 |
| 2011/0153735 A1 | 6/2011 | Eisenberg | |
| 2011/0179180 A1 | 7/2011 | Schleifer et al. | |
| 2011/0213873 A1 * | 9/2011 | Johansson | H04L 65/104 |
| | | | 709/223 |
| 2011/0246761 A1 | 10/2011 | Alexandrov | |
| 2011/0280118 A1 | 11/2011 | Maharana et al. | |
| 2011/0283203 A1 * | 11/2011 | Periyannan | H04N 7/141 |
| | | | 715/753 |
| 2012/0002001 A1 * | 1/2012 | Prentice | H04N 7/147 |
| | | | 348/14.08 |
| 2012/0089739 A1 * | 4/2012 | Telikepalli | H04L 65/1006 |
| | | | 709/227 |
| 2012/0176469 A1 * | 7/2012 | Moore | H04N 7/152 |
| | | | 348/14.13 |
| 2012/0192088 A1 * | 7/2012 | Sauriol | G06F 3/011 |
| | | | 715/757 |
| 2013/0027508 A1 * | 1/2013 | Charish | H04M 3/56 |
| | | | 348/14.08 |
| 2013/0067121 A1 * | 3/2013 | Beel | H04M 3/567 |
| | | | 710/20 |
| 2013/0106989 A1 * | 5/2013 | Gage | H04N 7/152 |
| | | | 348/14.09 |
| 2013/0120651 A1 | 5/2013 | Perry | |
| 2013/0304934 A1 * | 11/2013 | Joch | H04L 65/607 |
| | | | 709/231 |
| 2014/0082661 A1 | 3/2014 | Krahnstoever et al. | |
| 2014/0118468 A1 * | 5/2014 | Purdy | H04L 65/1083 |
| | | | 348/14.08 |
| 2014/0181266 A1 * | 6/2014 | Joch | H04L 65/80 |
| | | | 709/219 |
| 2014/0229866 A1 | 8/2014 | Gottlieb | |
| 2014/0241215 A1 | 8/2014 | Massover et al. | |
| 2014/0355897 A1 | 12/2014 | Tourapis | |
| 2014/0365620 A1 | 12/2014 | Lindberg et al. | |
| 2015/0002614 A1 * | 1/2015 | Zino | H04N 7/148 |
| | | | 348/14.08 |
| 2015/0089395 A1 | 3/2015 | Beel et al. | |
| 2015/0365244 A1 | 12/2015 | Schmitz | |

OTHER PUBLICATIONS

Defination of Codec by About.com, Dec. 25, 2011, 1 page (Year: 2011).*

Howard Wen, Three free tools for teleconferencing with a 'virtual presence', Nov. 19, 2008, 7 pages (Year: 2008).*

Collaboration in Virtual Rooms, Dec. 30, 2005, 4 pages (Year: 2005).*

(56) References Cited

OTHER PUBLICATIONS

Wenjun Wu, Ahmet Uyar, Hasan Bulut, Geoffrey Fox, Integration of SIP VoIP and Messaging with the AccessGrid and H.323 Systems, Jan. 2003, 11 pages (Year: 2003).*
Written Opinion of the International Searching Authority for PCT/EP2013/000524 dated Nov. 28, 2013 (Form PCT/ISA/237).
International Search Report for PCT/EP2013/000524 dated Nov. 28, 2013 (Form PCT/ISA/220).
International Preliminary Report on Patentability and Written Opinion of the International Searching Authority for PCT/EP2013/000524 dated Aug. 25, 2015 (Form PCT/ISA/237) (English Translation).

* cited by examiner

COLLABORATION SYSTEM FOR A VIRTUAL SESSION WITH MULTIPLE TYPES OF MEDIA STREAMS

CROSS-REFERENCE TO RELATED APPLICATIONS

This application is a continuation application of U.S. patent application Ser. No. 14/399,083, which is the United States national phase under 35 U.S.C. § 371 of PCT international patent application no. PCT/EP2013/000524, filed on Feb. 22, 2013.

BACKGROUND OF THE INVENTION

Field of the Invention

Embodiments relate to methods for controlling data streams of a virtual session with multiple participants, a collaboration server, a computer program, a computer program product, and a digital storage medium.

Background of the Related Art

It is common practice to use a collaboration service or server for the control of conferencing applications, and exchange of viewable content and files between multiple participants. Today's collaboration servers are fine tuned to the nature of the participants, specific media formats, and/or signaling protocols. For example the collaboration service sets up a connection for VoIP or ISDN technologies for audio, or audio and video conferencing, and then only supports audio or audio and video. VoIP-solutions often only support SIP or H.323 as the signaling protocol. On the other hand the so-called web collaboration servers, which offer for example shared desktop and whiteboard features, are known, in their case the data exchange occurs frequently via the http protocol. As a further class web cast systems have established themselves, in which exactly one video recording can be distributed to a large number of passive participants via web/http protocols. Frequently a content picture can be transmitted alongside, in which then, for example a PowerPoint® presentation takes place in parallel.

In practice this means, for each type of media and client a separate collaboration service is provided; they are installed, maintained and updated in a server environment. If necessary, for a specific media and/or client type of a requesting participant where no collaboration service is installed; this must be then first researched and installed, before a requesting participant can participate in a virtual meeting.

BRIEF SUMMARY OF THE INVENTION

It would be helpful to simplify the control of data streams of a virtual session with multiple participants. It would also be helpful to reduce the administration costs for installation and maintenance of services in a server environment.

According to an aspect of the invention a method for controlling data streams of a virtual session with several participants who at least access one application in the virtual session is proposed whereby in a centralized process for each participant according to his/her individual requirements uses a selected media processing and signaling mode, and whereby the participants are represented by clients and the process is controlled by a server, whereby the choice of media processing and/or signaling mode is chosen by an evaluation of a terminal of each of the participants and the respective network bandwidth available to the participant, whereby an evaluation scheme with a plurality of evaluation criteria will be provided for the evaluation, whereby possible media processing and/or signaling modes are determined for a participant, said evaluation scheme being applied to each possible media processing and/or signaling mode, and whereby a media processing and/or signaling mode determined using a comparison of the evaluations for each possible media processing and/or signaling mode according to the applied evaluation scheme is selected for each individual participant. A centralized process within the meaning of the present invention is a process running in an enclosed software and/or hardware instance. Through the application of the evaluation scheme it is also possible to select the media processing and/or signaling mode with a best evaluation for the respective participant and thus select the optimal media processing and/or signaling mode for each participant.

BRIEF DESCRIPTION OF THE FIGURES

In the following the invention will be described based on preferred embodiments in detail and with the help of figures. Whereas

Figure 1:
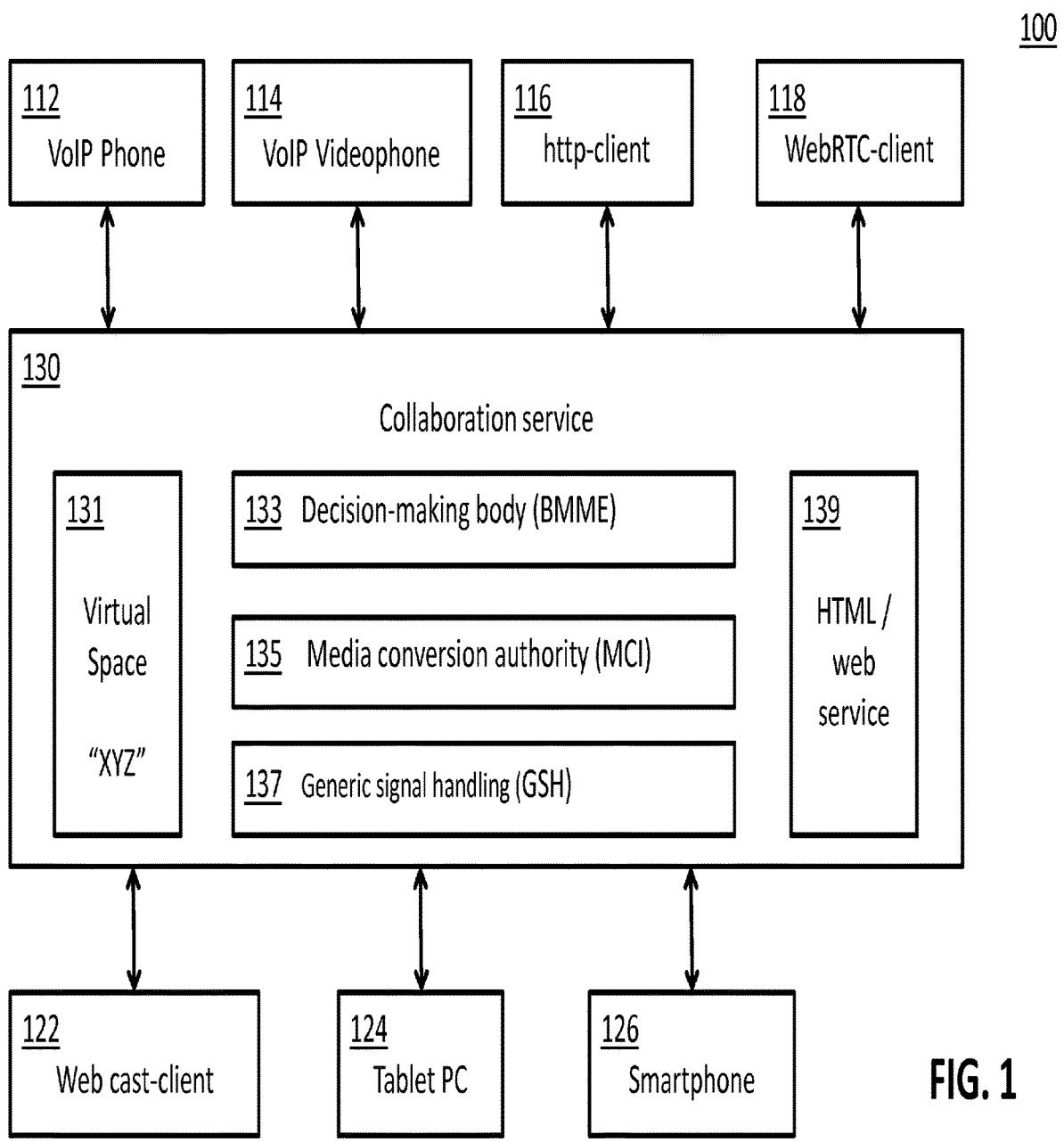
FIG. 1 is a schematic block diagram of a communication system with a collaboration service as a fundamental embodiment of the present invention.

The figures are purely schematic and not necessarily to scale. The drawing representations and descriptions thereof are meant as an exemplary illustration of the principle of the invention and should not limit same in any way.

DETAILED DESCRIPTION OF THE INVENTION

According to an aspect of the invention a method for controlling data streams of a virtual session with several participants who at least access one application in the virtual session is proposed whereby in a centralized process for each participant according to his/her individual requirements uses a selected media processing and signaling mode, and whereby the participants are represented by clients and the process is controlled by a server, whereby the choice of media processing and/or signaling mode is chosen by an evaluation of a terminal of each of the participants and the respective network bandwidth available to the participant, whereby an evaluation scheme with a plurality of evaluation criteria will be provided for the evaluation, whereby possible media processing and/or signaling modes are determined for a participant, said evaluation scheme being applied to each possible media processing and/or signaling mode, and whereby a media processing and/or signaling mode determined using a comparison of the evaluations for each possible media processing and/or signaling mode according to the applied evaluation scheme is selected for each individual participant. A centralized process within the meaning of the present invention is a process running in an enclosed software and/or hardware instance. Through the application of the evaluation scheme it is also possible to select the media processing and/or signaling mode with a best evaluation for the respective participant and thus select the optimal media processing and/or signaling mode for each participant.

According to a preferred embodiment the applications include at least some of the following group, which contains:
 audio and/or video conferences, particularly in a VoIP environment;
 data exchange between participants, in particular on the type of shared desktop or whiteboard;
 webcasting with or without transfer of content pictures.

According to a further preferred embodiment the media processing is selected from the group, which at least contains one adjustment of image formats, one conversion of text into speech and one conversion of language into text.

According to a further preferred embodiment the signaling mode is selected from the group, which contains SIP, H.323, HTTP, Web/http and WebRTC.

According to a further preferred embodiment a generic signaling protocol is deployed, that is suitable for the abstraction of any signaling modes, where a data stream will be abstracted from the virtual space into the generic signaling protocol and then the generic signaling protocol is transferred to the selected signaling mode for the participants. The generic signaling protocol is In particular a signaling protocol that belongs to the server. In addition, a data stream of the participant can be abstracted into the generic signaling protocol and then the generic signaling protocol can be transmitted into a signaling type required by the application.

According to a further preferred embodiment the evaluation system provides to award appropriate points for selected or all evaluation criteria for the requirements, and add the score of all evaluation criteria, in order to obtain an evaluation of a potential media upsampling, where in particular preference is given to a predetermined weighting of the evaluation criteria.

According to a further preferred embodiment the evaluation criteria are selected from the group, which contains a browser resolution, an audio quality, a computing power on one side of the user and a conversion effort on one side of a procedure, which is running the instance.

According to a further preferred embodiment, the centralized process manages the virtual session.

According to a further preferred embodiment, the virtual meeting is shown to the participants in a virtual room.

According to a further aspect of the invention a collaboration server to control data streams of a virtual session with multiple participants is proposed, which is designed and set up to execute the above described procedure.

With the process according to the invention participants can participate via any kind of protocol, either VoIP/SIP, H323, web/http, WebRTC, or other. With this realized collaboration service or server any type of participation and/or exchange of information can participate in a common virtual session or a virtual space, regardless of the type of the terminal equipment of the client, the technology used and the type of media. The protocol technology is arbitrary, and the collaboration service acts as a gateway, which offers always the best media and/or protocol conversions. The collaboration service can replace a large number of specialist services and is therefore a universal solution, in which all possible media types can be used in an ongoing session and thus a more effective and more transparent virtual meeting may be held. It eliminates the need for many single solutions, and only a single system is required, which can execute everything all at once. Furthermore the participants can also use their preferred client, and the collaboration (server) adjusts the different technologies accordingly.

Further aspects of the present invention concern a computer program, a computer program product, and a digital storage medium.

Further features, tasks, advantages and details of the present invention will be explained in more detail in the following description of exact implementation examples and their drawings in the attached figures. It goes without saying that characteristics, tasks, advantages and details are transferable from individual design examples to others and are considered as disclosed in the context of the other embodiments, in so far as this is not obviously absurd due to technical reasons or natural laws. Design examples can be combined, and the combination can also be understood as an embodiment of the invention.

In the following the invention will be described based on preferred embodiments in detail and with the help of figures. Whereas The figures are purely schematic and not necessarily to scale. The drawing representations and descriptions thereof are meant as an exemplary illustration of the principle of the invention and should not limit same in any way.

Figure 2:
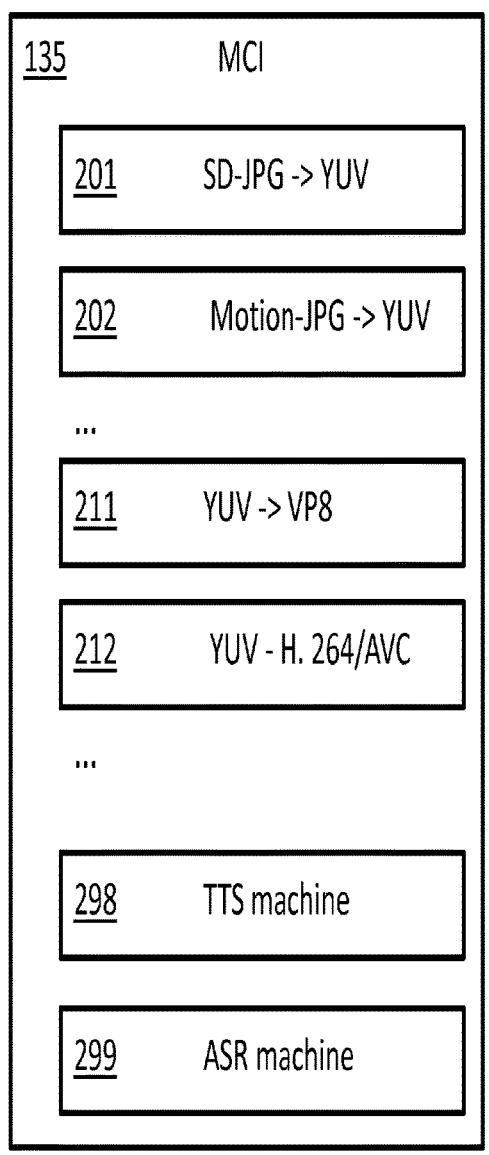
FIG. 2 is a schematic block diagram of a media conversion instance in the collaboration service of FIG. 1.
Figure 3:
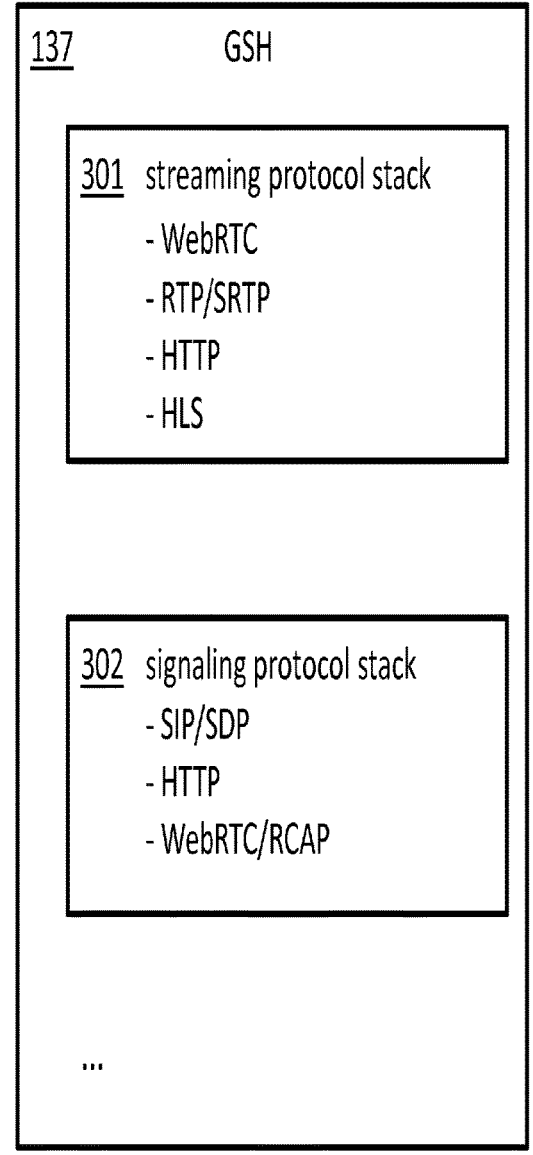
FIG. 3 is a schematic block diagram of a generic signal processing in the collaboration service of FIG. 1.

A basic embodiment of the present invention is demonstrated for illustrative purposes below in the FIGS. 1 to 3. Accordingly FIG. 1 is a schematic block diagram of the communication system 100 with a collaboration service 130 as an embodiment of the present invention and FIGS. 2 and 3, are schematic block diagrams, which illustrates an inner structure of a media conversion instance 135 and a generic signal processing 137 of the collaboration service 130.

According to the illustration in FIG. 1 in the communications system 100 several client end devices 112-126 are connected with a collaboration service 130.

The collaboration service 130 provides a virtual room 131 ("xyz"). The virtual room 131 can support a variety of applications, such as
 audio conferencing
 audio and video conferencing in real time (full duplex)
 passive participation in live sessions (so-called "Webcast" conferences)
 exchange of viewable content (so-called "Shared Desktop")
 exchange of multi-media boards (so-called "Virtual Whiteboard" or "Interactive Whiteboard")
 exchange of files (so-called "File Sharing").

Other applications for data and/or media transmission in real-time and offline are possible. The virtual room 131 can support a mix of these applications.

In addition, the collaboration service 130 includes a decision-making unit 133, a generic media conversion instance 135, a generic signal processing 137, and network connections service or HTML/web service 139, which will be described later in more detail.

The client end devices 112-126 associated with the collaboration service 130 include active and passive participants, which participate or intend to participate together in a conference or the like within the virtual room 131. The active participants include an IP phone 112, an IP videophone 114, an HTTP client 116 and an active network client 118. Passive participants include a passive viewer 122, a tablet PC 124 and a smartphone 126. While the active participants can send and receive data, the passive participants are only recipients of the data reception modus—the users of the passive participants are therefore observers. Each type of communication system, which enables a two-way transmission of data to another communication system outside of the communication facility and allows further output devices for the transferred data to a user of the communication facility, can be used as an active participant. Each type of communication system, which enables a one-way transmission of data in the direction to another communication system outside of the communication facility and allows further output devices for the transferred data to a user of the communication facility, can be used as a passive participant. Therefore each active participant can be used as a passive participant.

The IP Phone 112 is a Voice over Internet Protocol (VoIP) enabled standard telephone, which only supports voice and playback, and transmits signals via SIP/RTP protocol.

The IP videophone terminal 114 is, for example, a video roaming system, which transmits via the SIP/RTP signals.

The http client 116 is an example of a remote computer, which supports the shared desktop, whiteboard, audio, and video conferencing, and signals via http.

The active network client 118 is, for example, a remote computer, which supports the shared desktop, whiteboard, audio and video conferencing, and/or via http and WebRTC signals. In principle each type of computer, such as a workstation, a laptop/notebook, tablet/tablet PC, smartphone etc. can be used as an active network client 118, which allows the identification of at least one of the protocols VoIP, SIP, RTP, HTTP, or supports another protocol for data transfer or any of the services WebRTC, HLS, shared desktop, whiteboard or some other service for data transmission and display. In this respect the passive participants, who encompass the passive viewer 122, the tablet PC 124 and the smartphone 126, can act as active participants.

The passive viewer 122 is, for example, a remote computer, the shared desktop, whiteboard, audio, and video conferencing, supported and signaled via http, but currently only participates in observer mode (so-called "web cast") in the conference in the virtual room 131 and is ready to receive data via HLS (http live streaming).

The tablet computer 124 and the smartphone 126 are equipped with a web browser and capable for data transfer or reception via http/HLS; if necessary, WebRTC support is also intended.

The relatively well-known protocols and technical terms VoIP, SIP, RTP, HTTP, WebRTC, HLS, shared desktop, and whiteboard referred to the German Wikipedia entries for Session Initiation Protocol, Real-Time Transport Protocol, Web RTC, HTTP Live Streaming Desktop Sharing, VOIP, and Whiteboarding, as called up on Nov. 18, 2012 whose full disclosure is included as a reference to this application.

It is understood that each of the participants 112-126 can represent a wide variety of participants each identical or similar. It also understood, that other type of participants may be present. It goes without saying that the participants support several services and signaling protocols and can use and/or request these depending on the application. In terms of the supported services and the supported signaling protocols the invention is not specifically limited to the specified selection.

As can be seen from the above description, participants 112-126 support different services and different signaling protocols.

The collaboration service 130 is designed such that it provides for each of the participants 112-126 media processing and signaling of the individual requirements for data exchanged via the virtual room 13. To this end the collaboration service 130 features a decision-making body 133, which is also referred to as "Best Media Mapping Machine" (BMME) is a "Media Converter Instance" 135 (MCI), a Generic Signaling processing 137 (GSH) and a HTML/web service 139. The decision-making authority 133 makes a decision, how to process a respective media stream as much as possible with the media converter instance 135, so that the participants can participate as closely as possible in a meeting in the virtual room 131. I.e., the decision-making authority 133 tries, depending on participant access or chosen participant terminal, to negotiate the best possible conversion of the various media types and provides available conversions. The generic signaling processing 137 provides different protocol stacks to allow any clients, and HTML/web service 139, execute web applications for the communication between the virtual room 131 and the participants.

An inner structure of the media converter instance 135 is shown in FIG. 2. Consequently, the media converter instance 135 demonstrates a wide variety of converting devices 201-299. For example, a converter device 201 to transform a shared desktop JPG-image in a YUV-image stream, a converter device 202 to convert a motion JPG-image sequence in a YUV-image stream, a converter device 211 for conversion of a YUV-video stream in VP8, a converter device 212 to transform a YUV-video stream in VP8 in H.264/AVC, a TTS-converter device 298 to transform text stream into an audio stream, an ASR-converter device 299 to transform an audio stream into a text stream. It is understood that the above described and depicted instances in the figure are only an exemplary excerpt of converter devices from which media conversions are possible. The number of possible conversion machines is also not limited to on a specific value such as 99. It is further to be noted that the media conversion device 135 allows not only a transcoding of a media type (e.g. pictures), but also a media type conversion (e.g. text to speech and vice versa).

For explanations of the relatively well known protocols and technical terms JPG, Motion-JPG, YUV, VP8, H.264/AVC, TTS, and ASR, the German Wikipedia pages for JPEG, JPEG File Interchange Format, Motion JPEG, YUV-Farbmodell, VP8, H.264, Speech Synthesis, and Speech Recognition, as opened on Nov. 8, 2012 and their full disclosure is included in this application by reference.

Which conversion machine(s) is/are used, decides the decision-making body 133. The decision-making body 133 will assess the terminal and the network bandwidth of the participant and decides which media streams and will be converted how, and with what properties. The properties can also change: for example, the resolution of a video picture can decrease or a shared desktop screen size of 2540*1440 pixels can be reduced to VGA-H.264, etc.

The conversion rules are defined by configuration within the decision-making body 133. Here, the rules each receive "points". Indeed, multiple conversion rules can be possible and the system must decide which one to use. For example, a browser supports high or less high resolutions; the same applies to high or worse audio quality. Then on the basis of the rules and the point allocation the best matching rule ("Matching Rule") is used, i.e., the one rule which provides most of the points. This best rule also considers variables such as the of the performance capabilities of the terminal device (for example, iOS has fewer capabilities than a Window7 workstation) and the bandwidth, which has been monitored in passing (e.g., via RTCP), and also the conversion efforts on the server side (for example a conversion of H.264 in VP8 and vice versa would be "expensive" and would receive less points). For explanations of the relatively well-known protocol RTCP, reference is made the German Wikipedia page for RTCP, as called up on Nov. 18, 2012, whose disclosure is included in this application by reference.

Construction of a generic signal processing 137 is illustrated in more detail in FIG. 3. Consequently, the generic signal processing protocol stack 137 includes a streaming protocol stack 301 a signal protocol stack 302.

The streaming protocol stack 301 assigns the protocols WebRTC, RTP/SRTP, HTTP, and HLS.

The signal protocol stack 302 assigns the protocols SIP/SDP, http, and WebRTP/ROAP. ROAP (RTCWeb Offer/Answer Protocol) is a protocol for the negotiation of media between browsers and other compatible devices.

The generic signal processing 137 also provides a generic signaling protocol as an internal signaling protocol of the collaboration service 130. For this the generic signal processing 137 converts a data stream from the virtual room or from a data stream originating from a participant into the generic signaling protocol. Then the generic signal processing 137 converts the generic signaling protocol into the signaling mode selected for the participant to a signaling type required for this application. Based on the streaming protocol stack and the signaling protocol stack almost any adjustments to the signaling mode are possible in an efficient manner.

It is understood that the above described protocol stacks shown in the figure are only an exemplary excerpt from the possible protocol stacks. The number is also not limited to the two shown. On the contrary, a protocol stack should be made available for as many terminal devices as possible at the starting point of the collaboration service 130.

The HTML/web service 139 now hosts web applications in the event that a participant with an active or passive (webcast) session will enter the room through a web browser. It takes into consideration, what resolutions the terminal supports, and the decision-making body 133 is supplied with the relevant information. The interpretation of the application as well as the media density adapts to the device capabilities. If the browser is actively involved in a meeting it sends and receives data in real-time (for example, through WebRTC). However, if the browser is a passive participant in a meeting, it only receives real-time data, but does not send any. This can be achieved with the HLS-protocol for example. This ability also flows as a factor in the decision of the decision-making body 133.

According to the above description participants can participate with the collaboration service 130 via any kind of protocol, be it VoIP/SIP, H.323, web/http, WebRTC or other. With this the collaboration service 130 allows any type of participation and/or exchange of information in a common virtual session (virtual room 131), regardless of the type of the terminal equipment of the clients, the technology used and the type of media. The protocol technology is arbitrary, and the collaboration service 130 acts as a gateway, which offers always the best media and/or protocol conversions. The collaboration service 130 can replace a large number of specialist services and is therefore a universal solution, in which all possible media types can be used in an ongoing session and thus a more effective and more transparent virtual meeting may be held. It eliminates the need for many single solutions, and only a single system is required, which can execute everything all at once. Furthermore the participants can also use their preferred client, and the collaboration service 130 (server) adjusts the different technologies.

Figure 4:
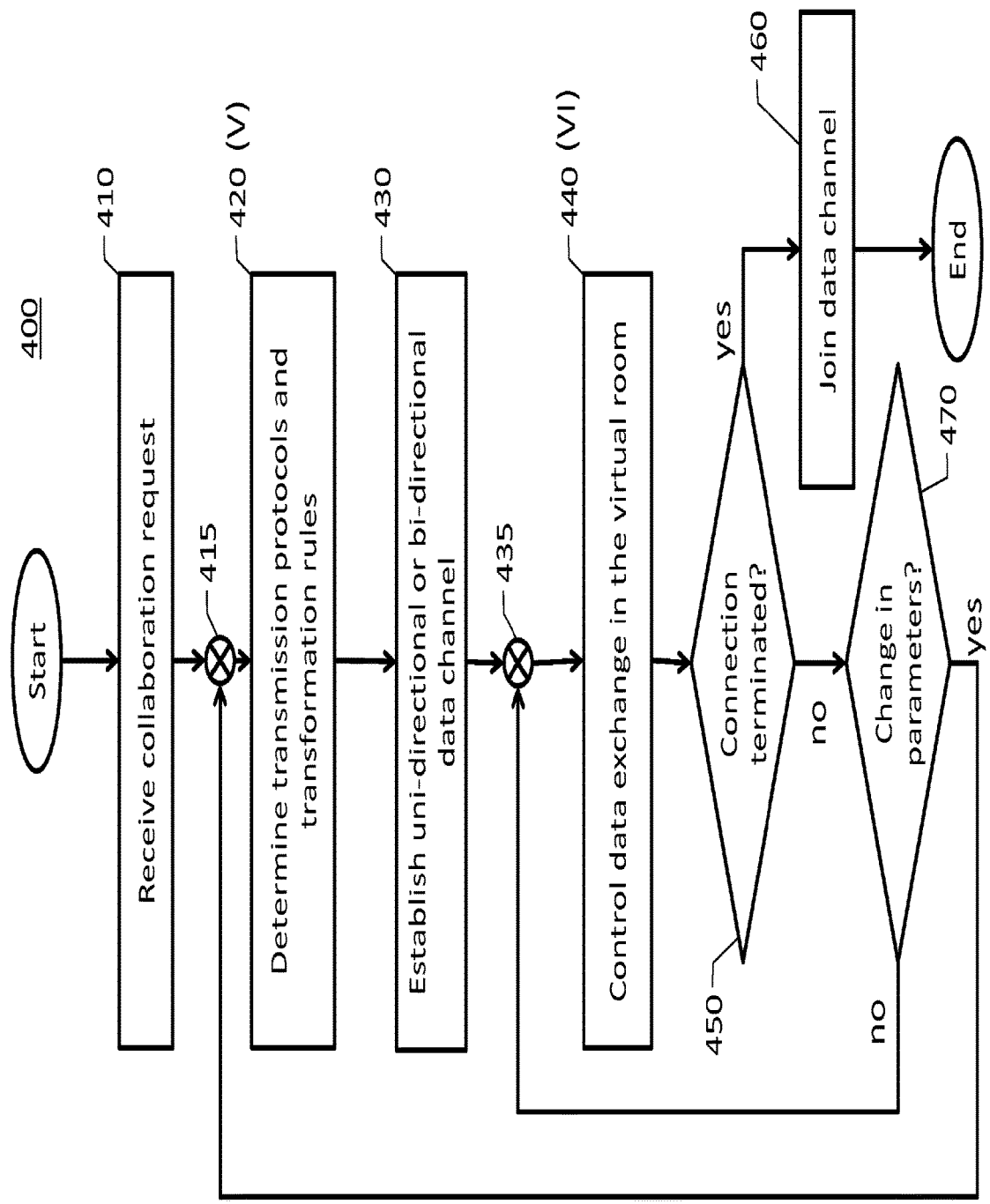
FIG. 4 is a schematic flowchart of a process of a connection control in the collaboration service of FIG. 1.
Figure 5:
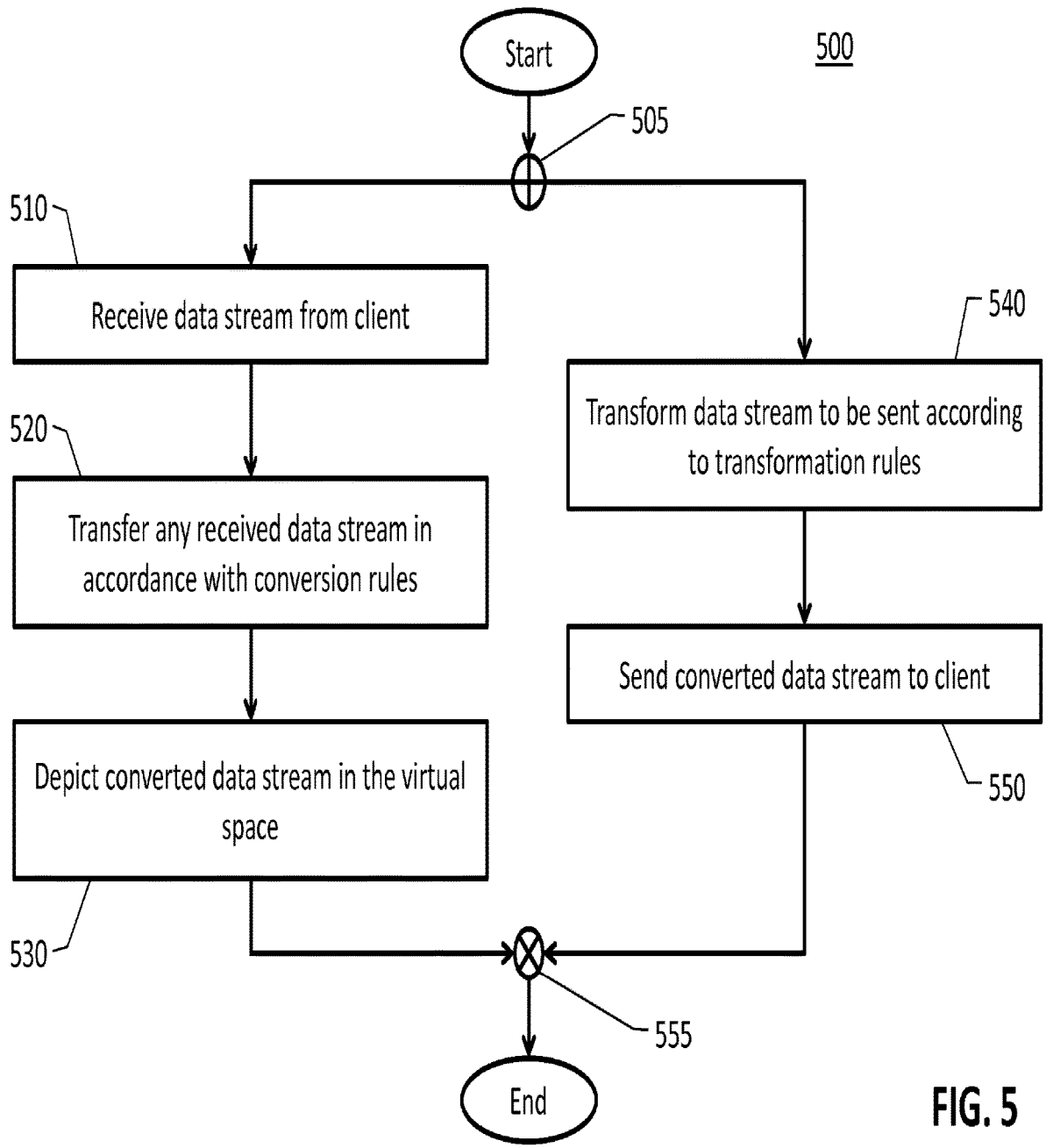
FIG. 5 is a schematic flowchart of a process for data exchange in the process of FIG. 4.
Figure 6:
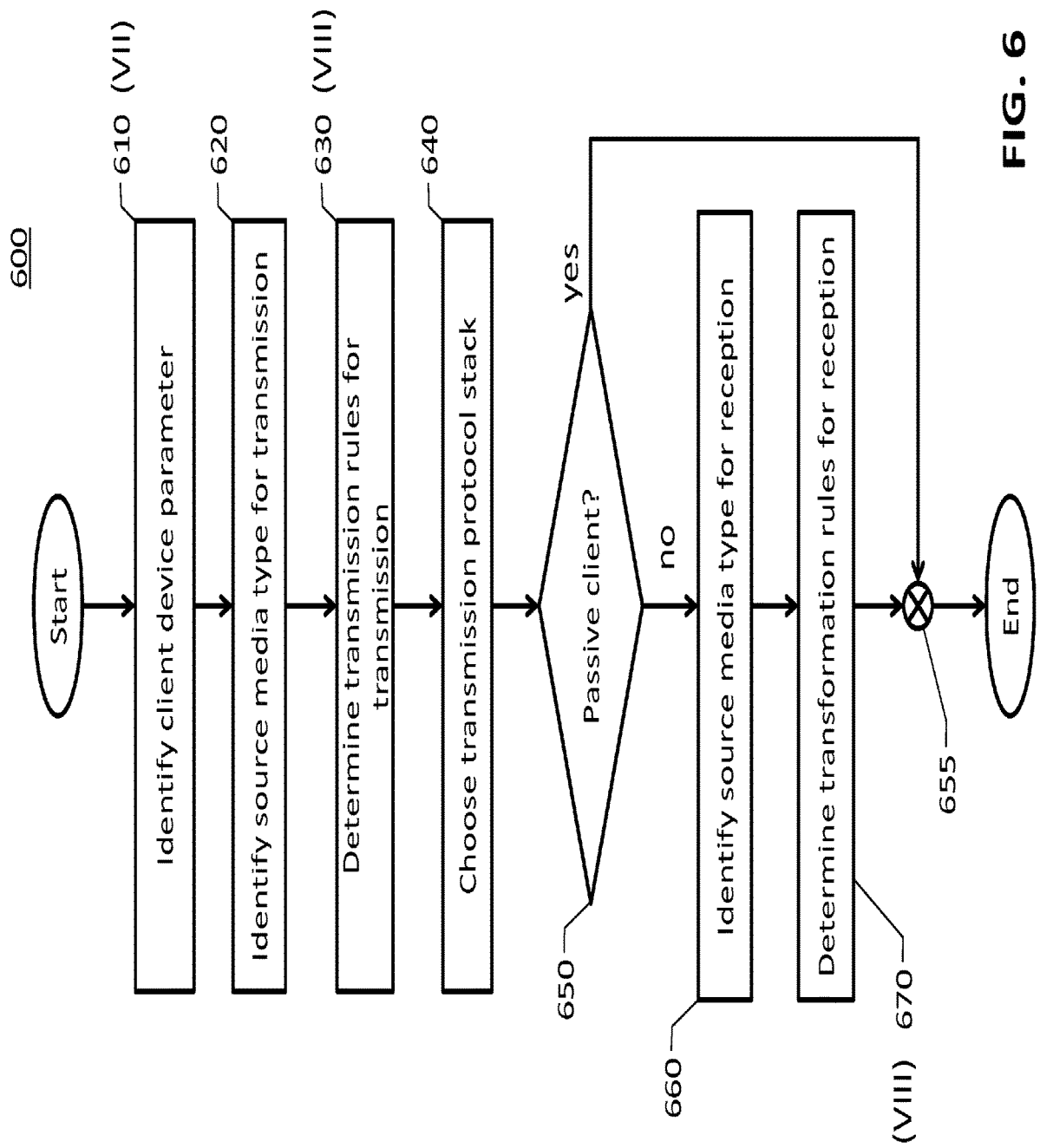
FIG. 6 is a schematic flow chart of a process for establishing protocols and rules in the process of FIG. 4.
Figure 7:
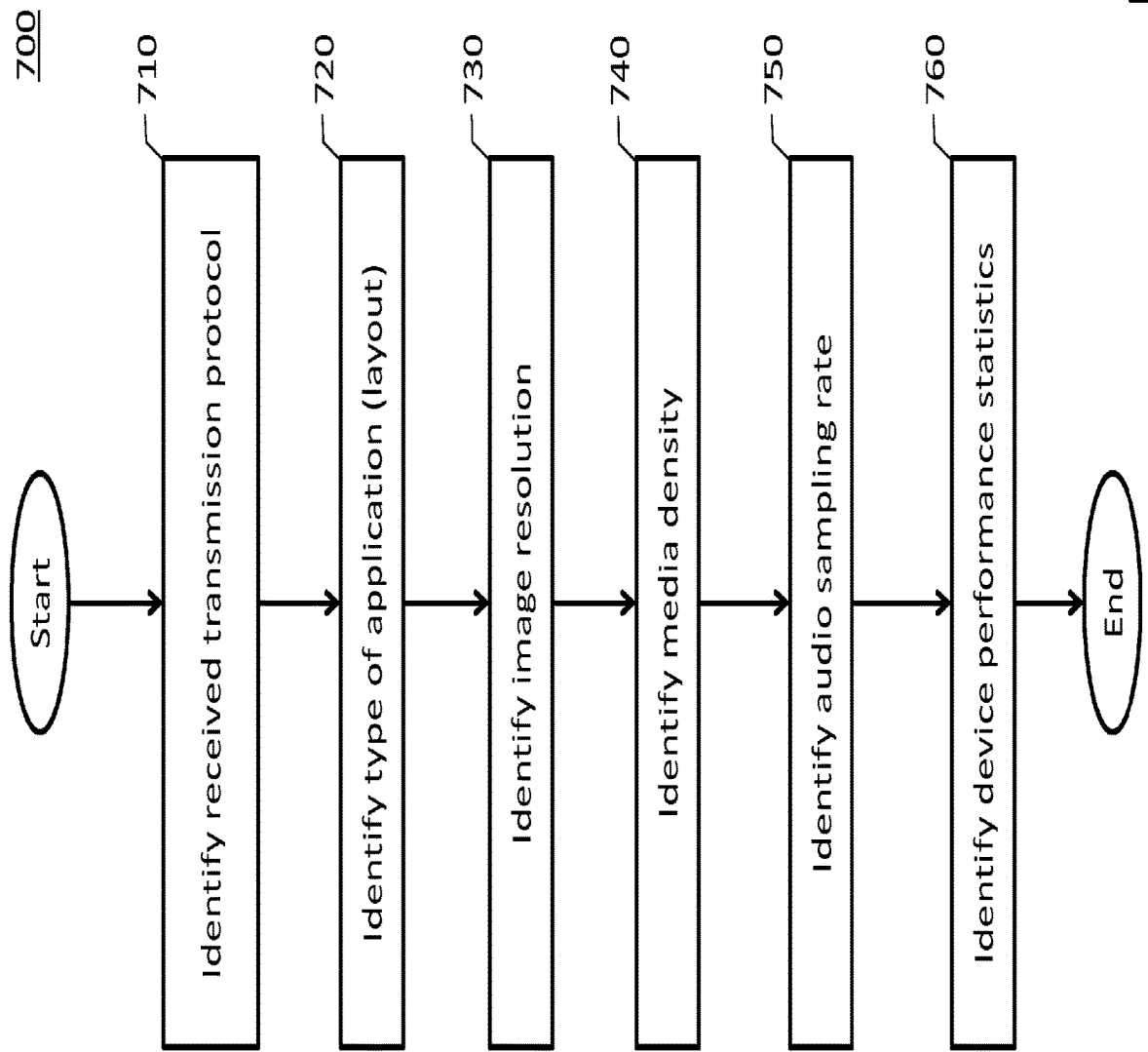
FIG. 7 is a schematic flow chart of a process for determining device parameters in the process of FIG. 6.
Figure 8:
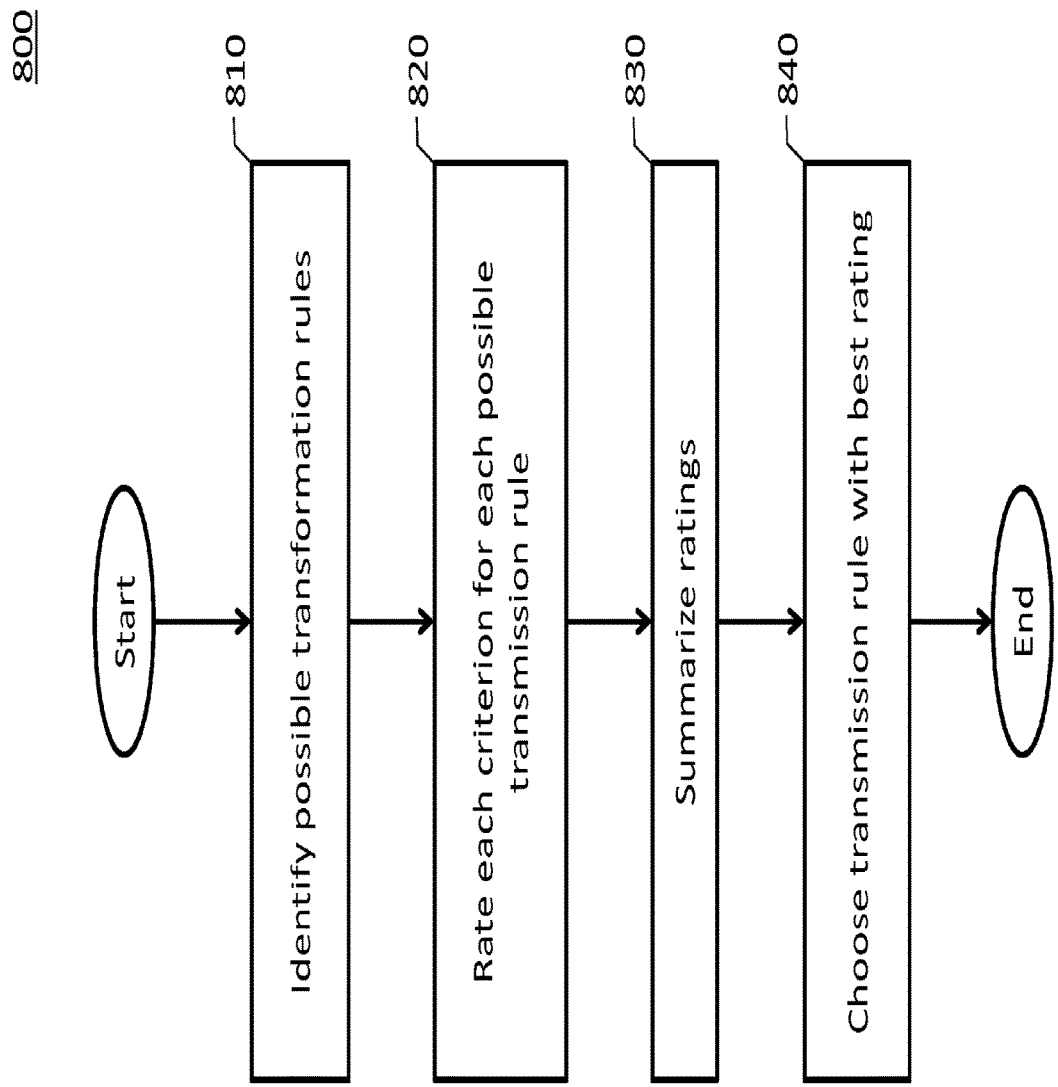
FIG. 8 is a schematic flow chart of a process for determining conversion rules in the process of FIG. 6.

A practical approach to control data streams within the meaning of the present invention is now described by way of an exemplary embodiment, which is illustrated in FIGS. 4 to 8 in the form of schematic flow charts. FIG. 4 is a schematic flow chart of a connection control process 400 in the collaboration service of FIG. 1. FIG. 5 is a schematic flow chart of the process 500 for the data exchange in the virtual room, which is executed instead of a step 440 in the connection control process 400. FIG. 6 is a schematic flow chart of a process 600 for the determination of protocols and rules, which is executed instead of a step 420 in the connection control process 400. FIG. 7 is a schematic flow chart of a subroutine 700 for the determination of the device parameters, which is executed instead of a step 610 in the determination process 600; and FIG. 8 is a schematic flow chart of a subroutine 800, which is executed in the determination process 600 instead of a step 630 or 670.

First, a connection control process 400 is described based on a flow chart shown in FIG. 4, which is performed by the collaboration service 130 of FIG. 1. The connection control process 400 is a process or procedure for control of data streams within the meaning of the present invention.

According to the illustration in FIG. 4 the connection control process is initiated after its start or call with a step 410 in which a collaboration request is received from an external client. The requesting client can be, for example, but is not limited to, each of the participants 112-126 in FIG. 1. The step 410 is assigned to the HTML/web service 139 in FIG. 1.

Via a junction point 415, which is basically a function of a return address in the process 400, the process 400 continues to a step 420, in which transmission protocols and conversion rules for data exchange are being used. Step 420 is illustrated in FIG. 5 as a process in greater detail, as commented in FIG. 4 by the Roman numeral "V".

Then, in a step 430 based on the specified transmission protocols established in step 420 a unidirectional or bidirectional data channel is established. The step 410 is again assigned to the HTML/web service 139 in FIG. 1.

A junction point 435, which is basically a return address function in the process 400, the process 400 continues to a step 440 in which the data exchange in the virtual room 131 in FIG. 1 is controlled. More specifically, data streams are controlled from the virtual room 131 to the appropriate clients and (in the case of a bi-directional connection) from this to the virtual room 131. Step 440 is illustrated in FIG. 6 as a process in greater detail as commented in FIG. 4 by the Roman numeral "VI".

The process 400 then continues to a step 450, in which will be assessed whether the communication in step 430 via the established data channel is finished or not.

In the case of a positive evaluation in Step 450, i.e., if a termination of the connection has been observed, in the next step 460 the data channel is closed down orderly, and the process 400 ends or refers back to the calling process.

In the case of a negative evaluation in Step 450, i.e., no termination of the connection has been observed, the next step 470 assesses whether or not a change in parameters has occurred or not. A change in parameters is understood to be, for example, but not limited to a modification of the device parameters of the clients, a change in device parameters for other clients, which concerns a modification of transmission protocols and/or conversion rules with respect to those clients, a modification in application parameters of an application running in a virtual room 131, or other parameters, which concern a change of transmission protocols and/or is using transformation rules concern, a change in a user application running in the virtual room 131, or other parameters, which could concern the communication with and processing at the client or the virtual room 131.

In the event of a positive assessment in Step 470, i.e., if a change in parameters has been observed, the process 400 jumps back to the branch point 415 in order to determine in Step 420 transmission protocols and conversion rules for this client and then continue further processing according to the above description.

In the event of a negative assessment in step 470, i.e., if no change in parameters has been observed, the process 400 jumps back to the branch point 435 in order to continue in Step 440 the control of the data exchange and then continues the further processing according to the above description.

The steps 450 to 470 are again assigned to the HTML/web service 139 in FIG. 1.

It is understood that the process 400 can run parallel or serial or sequentially for a wide variety of clients.

A data exchange control process 500 is now described with the help of a flowchart diagram shown in FIG. 5, which corresponds to the step 440 in the connection control process 400 of FIG. 4 and is labeled there with "V".

According to the illustration in FIG. 5, the process 500 leads after its beginning or its first call to a branch point 505. From here to the end of the left branch with steps 510 and 530, to receive data from a client, or to a right branch with Steps 540 and 550, to transmit data to the client. The right-hand branch (transmission branch) is always processed; the left-hand branch (reception branch) is only processed in the case of a bi-directional (i.e., full-duplex-) connection. The decision as to whether the left or the right branch is processed can be made using call parameters or left and right branch are alternately processed at each call of the process 500.

In the left-hand branch of the process 500 in Step 510 the client receives a data stream. The step 510 is assigned to the HTML/web service 139 in FIG. 1.

Then in Step 520 the data stream received in Step 510 is converted according to a conversion rule as defined in step 420 (FIG. 4). The step 520 is assigned to the media conversion instance 135 in FIG. 1.

Then, in Step 530 the data stream converted in Step 520 is shown in the virtual room 131, so that it is visible to other participants. The step 530 is assigned to the virtual room 131 in FIG. 1.

In the right-hand branch of the process 500 initially in Step 540 a data stream from the virtual room 131, which is to be sent to the client will be converted with a conversion rule according to Step 420 (FIG. 4). The step 520 is again assigned to the media conversion instance 135 in FIG. 1.

Secondly, in Step 550 the data stream converted in Step 540 is sent to the client. The step 530 is again assigned to the HTML/web service 139 in FIG. 1.

The left and right branch of the process 500 rejoins in a junction 555 back together. Then the process 500 ends or refers back to the calling process.

Although branch point 505 is symbolized as an OR-branch, the left and the right-hand branch also can be processed in parallel or in sequence. A query in order to assess if there is a bi-directional connection, can be upstream from the left-hand branch, and will only be executed in the event of a positive assessment, while in the case of a negative assessment a direct jump to the junction point 555 occurs.

The steps 510 and 540 can also include a query, which, if no data stream is received from the client or transferred to the client directly jumps to the junction point 555.

Based on a flow chart shown in FIG. 6 a protocol and rules determination process 600 (short determination process 600) is described in step 420 of FIG. 4, which corresponds to the connection control process 400 and is marked there as "VI".

According to the illustration in FIG. 6 the process 600 is initiated after its start or the call of step 610, in which first the device parameters for clients are determined. The Roman numeral "VII" illustrates step 610 later on in FIG. 7 as a process in greater detail than depicted in FIG. 6.

Then, in step 620 a source media type for transmissions to the client, i.e. a media type, which is requested by a queried application by the client, is determined within the virtual room 131 in FIG. 1. The virtual room 131 supplies this media type.

Then, in a step 630 a conversion rule for transmissions to client, i.e., a rule for converting a data type to a data type usable or requested by the client for use within the virtual room 131 in FIG. 1. The Roman numeral "VIII" illustrates step 630 later on in FIG. 8 as a process in greater detail as depicted in FIG. 6.

Subsequently, in a step 640 a protocol stack for transmissions to the client is selected.

In a step 650 it is then assessed whether or not the client is a passive client.

In the event of a positive assessment in step 650, i.e., if the client is a passive client, process 600 jumps to a junction point 655, and then process 600 ends or refers back to the calling process.

In the event of a negative assessment in step 650, i.e., if the client is an active client, which requires a two-way data transmission, process 600 continues to a step 660, in which a initially a source media type provided by one of the client data stream is determined. This media type is delivered by the HTML/web service 139 in FIG. 1.

Then, in a step 670 a conversion rule for a reception of data streams from the client is determined, i.e., a rule for converting a data type supplied by the client into a data type required by the application within the virtual room 131 in FIG. 1. The step 670 corresponds to the step 630 with reverse initial parameters and will be illustrated later on in further detail as a process in FIG. 8.

Next, the process 600 leads to the junction point 655, in order to end there.

A parameter determination process 700 is now described with the help of a flowchart diagram shown in FIG. 7, which corresponds to the step 610 in the determination process 600 of FIG. 6 and is labeled there with "VII".

According to the illustration in FIG. 7 the process 700 is initiated after its start or call of step 710, in which first a received transmission protocol for the client is determined. This transmission protocol is supplied by the HTML/web service 139 in FIG. 1.

Then in a step 720 an application type and/or a layout of a starting application on the client is determined. In a step 730 a screen resolution for the client is determined. In a step 740 a media density, which the client can process is determined. In a step 750, the audio sampling rate of the application is determined, and in Step 760 a device performance of the clients is determined. Device performance can encompass, for example, but is not limited to, performance data of the processor, the memory, a graphic card, a sound card, attached peripherals, etc.

Then the process 700 ends or refers back to the calling process.

It goes without saying that the above-described steps and parameters determined therein are an exemplary, non-exhaustive list. It is also not necessary in every case to determine all of the parameters. In fact, the list of parameters can be constrained to the practically most relevant cases depending on the type of application deployed and on the technology used.

A rules determination process 800 is now described with the help of a flowchart diagram shown in FIG. 8, which corresponds to the step 630 or 670 in the determination process 600 of FIG. 6 and is labeled there with "VIII". As already mentioned, the process 800 can be used for a rules determination for a media conversion for transmission or reception, in which case only the call parameters are reversed.

According to the illustration in FIG. 8, the process 800 is initiated after its beginning or call by a step 810, which determines potential conversion rules for the conversion of the source media type to the target media type.

Then, in a step 820 a designated number of possible evaluation criteria is used and evaluated for each possible conversion rule as determined by step 810. For example, for each evaluation criterion an evaluation score of 0 up to a specified maximum points is assessed. Possible evaluation criteria were already described above. It should be noted that the device parameters of the client, which were determined in step 610 in FIG. 6 (i.e., in the process 700 of FIG. 7) would be considered in the evaluation criteria. Equally the internal criteria of the collaboration service 130 in FIG. 1 such as transformation cost can be considered in the evaluation criteria.

Then in a step 830 the assessment for each possible conversion rule is summarized.

Finally, in a step 840 the conversion rule, which provides the best assessment, is selected from the determined potential conversion rules as determined by step 810. In other words, the conversion rule with the highest score of all their evaluation criteria in total will be selected.

Then the process 800 ends or refers back to the calling process.

In summary, the invention provides for the control of data streams of a virtual session with multiple participants via a centralized process while using for each participant a selected media processing and signaling mode according to his/her individual requirements. A centralized process is a process, which runs on an enclosed software and/or hardware instance. The centralized process can be in particular a collaboration service or server. The invention can also be embodied by a computer program, a computer program product or a digital storage medium.

The present invention has been described above through the use of preferred embodiment and represented graphically. It should be noted, however, that the present invention is defined solely by the independent patent claims and the above description of embodiments, modifications and further developments serve only as an exemplary illustration. Not all elements described above are necessarily required for the application and implementation of the invention, as long as they are not integrated in at least one independent claim as a mandatory feature.

What is claimed is:

1. A computer-implemented method by a collaboration server for converting collaboration media, the method comprising:
identifying a virtual room source media type for a virtual room source media associated with a virtual room and a first set of evaluation criteria;
converting the virtual room source media type to a generic signaling protocol used internally by the collaboration server;
identifying a plurality of potential conversion rules for converting the generic signaling protocol to a first target media type associated with a client device, wherein the first set of evaluation criteria comprise a first evaluation criterion associated with a parameter of the client device and a second evaluation criterion associated with a transformation cost for converting the generic signaling protocol to the first target media type;
for each of the potential conversion rules:
determining a first sub-score based on the first evaluation criterion and a second sub-score based on the second evaluation criterion; and
determining a score based, at least in part, on the first sub-score and the second sub-score;
rating the potential conversion rules based on their respective scores;
selecting, among the potential conversion rules, a first conversion rule based on the rating;
converting the generic signaling protocol to the first target media type based on the first conversion rule; and
transmitting the first target media type to the client device.

2. The computer-implemented method of claim 1, further comprising:
selecting a transmission protocol, and wherein transmitting the first target media type comprises transmitting using the transmission protocol.

3. The computer-implemented method of claim 2, wherein selecting the transmission protocol comprises selecting at least one of: a session initiation protocol (SIP), an H.323 protocol, a hypertext transfer protocol (HTTP), or a WebRTC protocol.

4. The computer-implemented method of claim 1, further comprising:
in response to determining a bi-directional data channel, identifying a client source media type for a client source media and one or more second evaluation criteria;
selecting a second conversion rule by rating one or more potential conversion rules based on the one or more second evaluation criteria;
converting the client source media to the generic signaling protocol and then to a second target media type based on the second conversion rule; and
causing the second target media type to be displayed through the virtual room.

5. The computer-implemented method of claim 4, wherein the client source media comprises media data associated with at least one of: an audio conference, a video conference, a shared desktop data exchange, a shared whiteboard data exchange, or a webcast.

6. The computer-implemented method of claim 1, further comprising:
determining a change in the first set of evaluation criteria;
in response to determining the change in the first set of evaluation criteria, selecting an updated first conversion rule by rating one or more potential conversion rules based on the change in the first set of evaluation criteria; and
converting the generic signaling protocol to an updated first target media type based on the updated first conversion rule.

7. The computer-implemented method of claim 1, wherein identifying the first set of evaluation criteria comprises identifying at least one of the parameter of the client device, a bandwidth, or the transformation cost.

8. The computer-implemented method of claim 1, wherein identifying the first set of evaluation criteria comprises identifying at least one of an application type, an application layout, a screen resolution, a media density, an audio sampling rate, or a device performance data.

9. The computer-implemented method of claim 1, wherein the virtual room source media comprises media data associated with at least one of: an audio conference, a video conference, a shared desktop data exchange, a shared whiteboard data exchange, or a webcast.

10. The computer-implemented method of claim 1, wherein converting the generic signaling protocol to the first target media type comprises at least one of: adjusting image formats, converting text into speech, or converting speech into text.

11. A system, comprising:
a processor;
a memory operatively connected to the processor and storing instructions that, when executed by the processor, cause the processor to perform operations comprising:
identifying a virtual room source media type for a virtual room source media associated with a virtual room and a first set of evaluation criteria;
converting the virtual room source media type to a generic signaling protocol used internally by the collaboration server;
identifying a plurality of potential conversion rules for converting the generic signaling protocol to a first target media type associated with a client device, wherein the first set of evaluation criteria comprise a first evaluation criterion associated with a parameter of the client device and a second evaluation criterion associated with a transformation cost for converting the generic signaling protocol to the first target media type;
for each of the potential conversion rules:
determining a first sub-score based on the first evaluation criterion and a second sub-score based on the second evaluation criterion; and
determining a score based, at least in part, on the first sub-score and the second sub-score;
rating the potential conversion rules based on their respective scores;
selecting, among the potential conversion rules, a first conversion rule based on the rating;
converting the generic signaling protocol to the first target media type based on the first conversion rule; and
transmitting the first target media type to the client device.

12. The system of claim 11, wherein the memory stores further instructions that, when executed by the processor, cause:
selecting a transmission protocol, and wherein transmitting the first target media type comprises transmitting using the transmission protocol.

13. The system of claim 12, wherein the memory stores further instructions that, when executed by the processor, cause:
in response to determining a bi-directional data channel, identifying a client source media type for a client source media and one or more second evaluation criteria;
selecting a second conversion rule by rating one or more potential conversion rules based on the one or more second evaluation criteria;
converting the client source media to the generic signaling protocol and then to a second target media type based on the second conversion rule; and
causing the second target media type to be displayed through the virtual room.

14. The system of claim 13, wherein the memory stores further instructions that, when executed by the processor, cause:
determining a change in the first set of evaluation criteria;
in response to determining the change in the first set of evaluation criteria, selecting an updated first conversion rule by rating one or more potential conversion rules based on the change in the first set of evaluation criteria; and
converting the generic signaling protocol to an updated first target media type based on the updated first conversion rule.

15. The system of claim 13, wherein the first set of evaluation criteria further comprise a bandwidth.

16. The system of claim 13, wherein identifying the first set of evaluation criteria comprises identifying at least one of: an application type, an application layout, a screen resolution, a media density, an audio sampling rate, or a device performance data.

17. The system of claim 13, wherein converting the generic signaling protocol to the first target media type comprises at least one of: adjusting image formats, converting text into speech, or converting speech into text.

18. The system of claim 13, wherein the transmission protocol comprises at least one of: a session initiation protocol (SIP), an H.323 protocol, a hypertext transfer protocol (HTTP), or a WebRTC protocol.

19. The system of claim 13, wherein the virtual room source media comprises media data associated with at least one of: an audio conference, a video conference, a shared desktop data exchange, a shared whiteboard data exchange, or a webcast.

20. The system of claim 13, wherein the client source media comprises media data associated with at least one of: an audio conference, a video conference, a shared desktop data exchange, a shared whiteboard data exchange, or a webcast.

* * * * *